May 24, 1966

C. JACUZZI 3,252,575

PUMP AND FILTER ASSEMBLY FOR SWIMMING POOL SYSTEMS

Filed June 26, 1962

INVENTOR.
CANDIDO JACUZZI
BY Bruce & Brosler
HIS ATTORNEYS

May 24, 1966 C. JACUZZI 3,252,575
PUMP AND FILTER ASSEMBLY FOR SWIMMING POOL SYSTEMS
Filed June 26, 1962 3 Sheets-Sheet 2

INVENTOR.
CANDIDO JACUZZI
BY
Bruce & Brosler
HIS ATTORNEYS

May 24, 1966
C. JACUZZI
3,252,575
PUMP AND FILTER ASSEMBLY FOR SWIMMING POOL SYSTEMS
Filed June 26, 1962
3 Sheets-Sheet 3
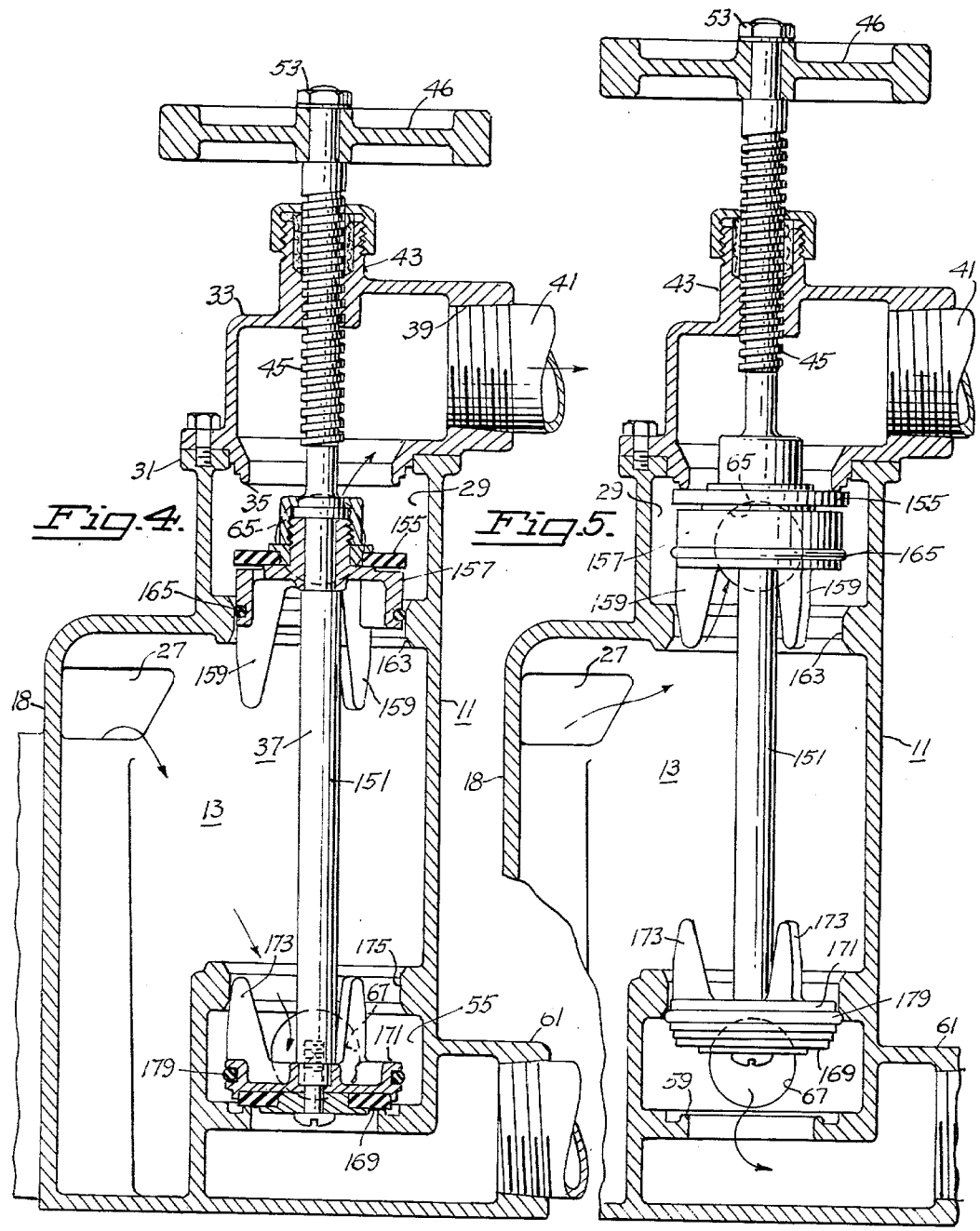
INVENTOR.
CANDIDO JACUZZI
BY
Bruce & Brosler
HIS ATTORNEYS

United States Patent Office 3,252,575
Patented May 24, 1966

3,252,575
PUMP AND FILTER ASSEMBLY FOR SWIMMING POOL SYSTEMS
Candido Jacuzzi, Lafayette, Calif., assignor to Jacuzzi Bros., Incorporated, a corporation of California
Filed June 26, 1962, Ser. No. 205,354
4 Claims. (Cl. 210—136)

This invention relates to swimming pool systems and has particular relationship to pump and filtering assembly for swimming pool systems or the like.

In the operation and maintenance of a swimming pool, it is necessary that the water in the pool be continuously filtered to remove impurities, and strained to remove such items as hair, leaves and the like. A typical pool system includes as auxiliary apparatus, principally a filter, a strainer and a pump for circulating the water through the filter and strainer. As the filter operates, it accumulates waste which reduces its effectiveness, and it therefore becomes necessary at intervals to clean the filter. For this purpose the filter is disconnected from the pool and connected to a waste receiving facility, and the waste is flushed out of the filter into the waste facility by a reverse flow from the pool. Such reversing operation requires valve means which may be selectively operated to permit the pump to either circulate water through the strainer, filter and pool or to cause the pump to pump the waste from the filter by reverse flow through the filter and into the waste facility.

In accordance with the teachings of the prior art, the pump, strainer, filter and valve means are separate components and distributed throughout the pool system. This demands a complex and costly plumbing operation which adds considerable to the cost of the installation.

It is an object of this invention to correct the above described deficiencies and specifically, to not only materially reduce the plumbing required in the installation of swimming pool systems, but to reduce substantially the cost of succh systems, including the initial production and fabrication of the components involved.

In accordance with this invention in its specific aspect, water treating apparatus is provided in which the pump, filter, strainer and valve means are combined into an integrated unit, in which the valve means operates as the cooperative factor between the filter on the one hand and the pump and strainer on the other.

Specifically, a unitary supporting structure, for example, a casting, is provided, which by suitable partition walls, defines a strainer chamber and a valve chamber, with intermediate provision for installation of a pump. The casting further includes provisions for connection of a filter, in proper flow relationship in the pool system, both for normal filter operation and for a backwash operation to clean the filter.

The integrated unit here described minimizes the plumbing required. The walls of the separate compartments, particularly for the valve and strainer, are common where permissible, so that there is a saving in material, besides providing larger volume compartments in a given size casting. Apparatus having a greater operating capacity than analogous prior art apparatus may then occupy the same or smaller volume.

The apparatus according to this invention lends itself to manufacturing economies. Only a single casting need be handled in machining, rather than a plurality of parts carreid through a series of operations.

The apparatus in accordance with this invention may also be packaged more readily and thus the overall weight of parts to be shipped from remote points and the cost of shipment may be reduced.

The novel features, characteristic of this invention are described generally above. For a better understanding of the invention itself, both as to its organization and as to its method of operation, together with additional objects and advantages thereof, reference is made to the following drawings, wherein:

FIG. 4 is a view in section taken along line 4—4 of FIG. 1 showing a selectively operable valve assembly in the position in which filtered water is circulated through the pool; and FIG. 5 is a view in section taken along line 4—4 of FIG. 1 with the same valve in the waste disposal position.

Figure 1:
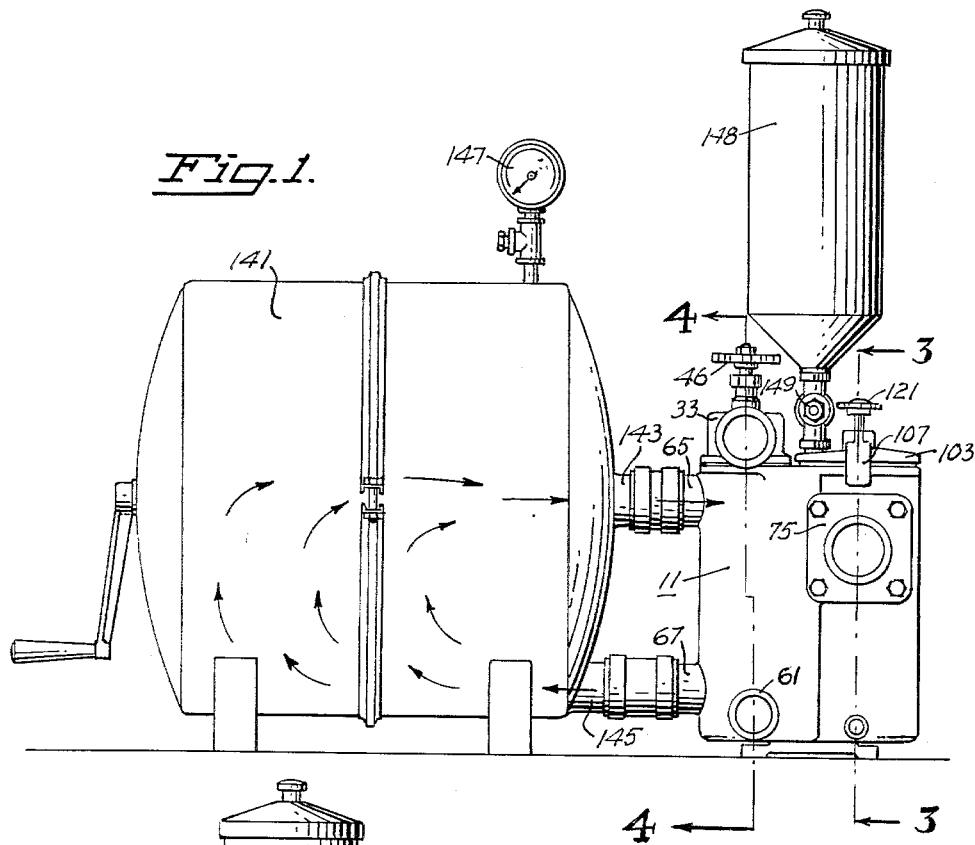
FIG. 1 is a view in side elevation of a preferred embodiment of this invention.
Figure 2:
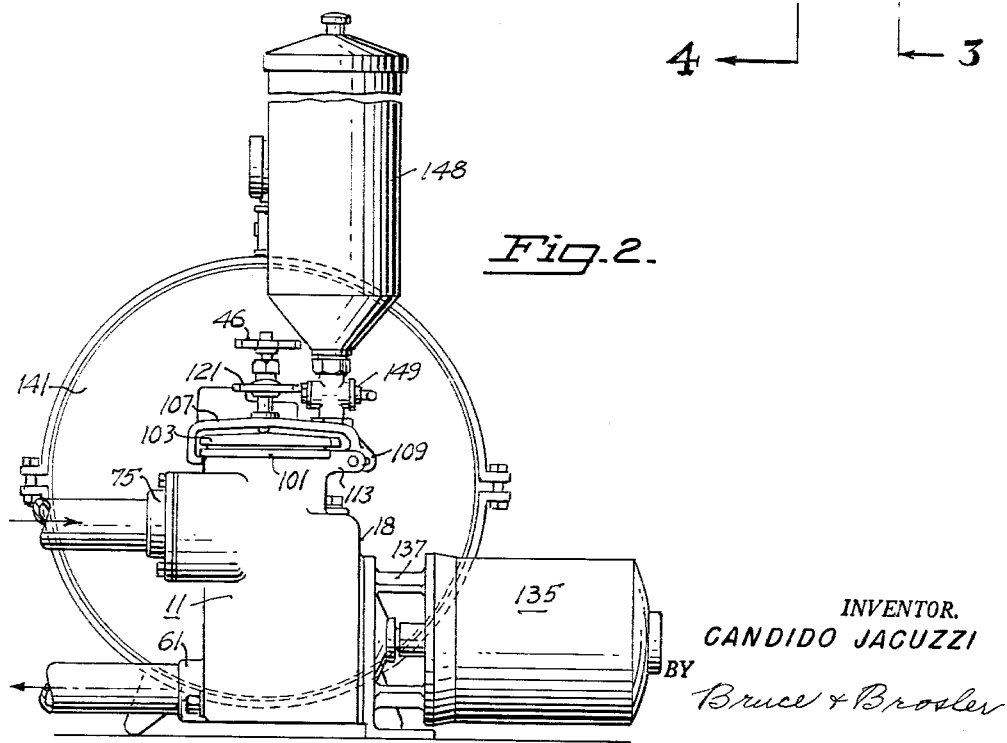
FIG. 2 is a view in end elevation of this embodiment.
Figure 3:
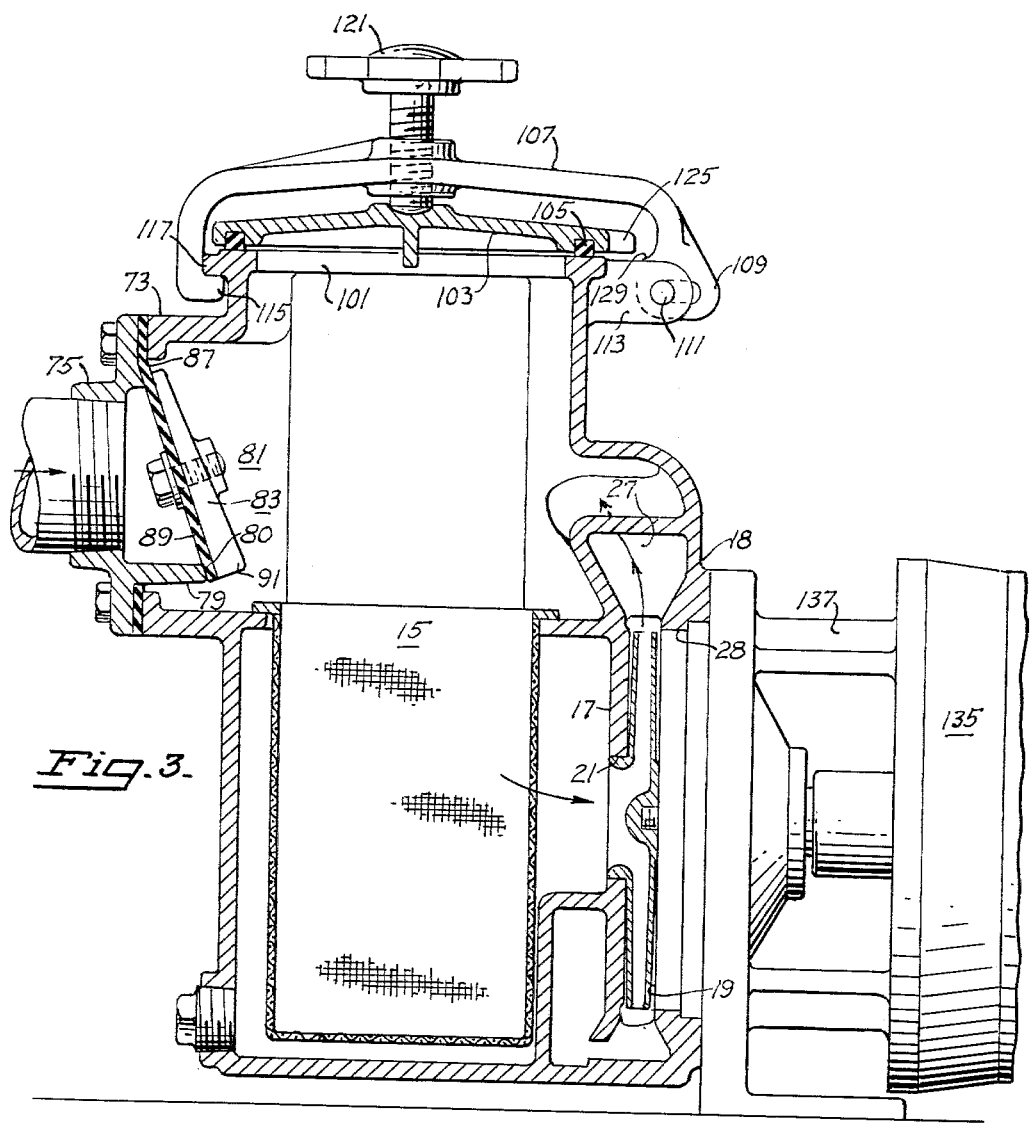
FIG. 3 is a view in section taken along line 3—3 of FIG. 1.

Functionally the apparatus shown in the drawings may be separated into a pump, a filter, a valve assembly unit, a strainer unit, and a slurry tank. Structurally these units are integrated about a supporting structure which is typically and preferably a casting 11.

The casting 11 is hollow and includes principally a valve assembly chamber 13 and a strainer chamber 15. The casting is formed with a partition 17 (FIGS. 4 and 5) which defines with an outer wall 18, a narrow impeller pump chamber 19 for the impeller of a centrifugal type pump. In the partition 17 is an opening 21 to provide a suction inlet from the strainer chamber to the pump chamber, while a peripheral volute passageway 27 carries the pump discharge to the chamber 13 provided for housing a valve assembly. In the outer wall 18 is an opening 28 of sufficient diameter to permit installation of a pump impeller into its chamber 19.

The valve chamber 13 has a generally cylindrical end section 29 terminating in an upper seating flange 31 to which an auxiliary casting 33 is bolted. This casting has a cylindrical lip 35 which projects downwardly into the end section 29 and serves as one of the valve seats for a multiple valve assembly 37. The casting 33 also includes an internally threaded pipe opening 39 into which a pipe 41 connecting the valve chamber 13 to the pool (not shown) extends. An internally and externally threaded boss 43 extends from the top of the casting 33 to adjustably receive the threaded stem 45 of a control handle 46 for manipulating the valve assembly 37. An external nut 53 on the stem permits of locking the handle and valve assembly together.

In the lower portion of the valve chamber 13 is a cylindrical end section 55 corresponding to the end section 29, and having an opening bounded by a lip 59 adapted to function as a valve seat. This opening flow connects the end section 55 with an integral pipe fitting 61 for coupling of a discharge pipe to some waste facility.

A pair of integral pipe connections 65 and 67 extend integrally from the valve chamber 13 at each of the end sections 29 and 55, and serve for flow connecting the chamber 13 with a filter.

The chamber 15 is formed with a flanged inflow connection 73 to which a pipe fitting 75 is adapted to be bolted, and having an internally extending section 79 terminating on an angle to form an elliptical valve seat 80 in a check valve assembly 81. The valve 83 of this assembly is formed of a disk of rubber or the like, clamped between the inflow connection 73 and pipe fitting 75, with its center portion cut out to the diameter of the inflow opening, to the extent of leaving an unsevered or hinge section 87 to create a circular flap 89. To this flap is concentrically bolted a weighted disk 91, preferably of non-corrosive metal.

Normally the valve 83 is maintained closed by the force of gravity, but may be opened by the flow of water from the pool to the strainer chamber 15, but blocks reverse flow from the chamber 15 to the pool, by precluding siphoning of water to the pool during filter cleaning operation, since the equipment under consideration is usually installed above pool level and this would be conducive to siphoning action in the absence of the check valve assembly 81.

The chamber 15 is open at the top, the opening being rimmed by a seating flange 101. This opening is normally closed by a cover 103 and sealed by an O-ring 105 in a groove in the underside of the rim portion of the cover.

The sealing pressure is provided by a bail 107 having a slotted end 109 riding a hinge pin 111 carried by and between spaced brackets 113 extending from a wall of the strainer chamber 15.

At its opposite end, the bail terminates in an inturned hook 115 adapted, through a shift movement of the bail, to hook under and engage a tongue 117 extending from the rim of the chamber at that point.

Pressure sealing of the cover, under these conditions is effected by a manually adjustable pressure screw 121 threadedly extending through the bail at its mid-point and adapted to pressure engage the cover.

By withdrawal of the pressure screw and sliding the bail out of hook engagement with the tongue 117, the cover may be removed. Some difficulty, however, may be experienced in breaking the seal to accomplish such removal.

This operation can be made easy by providing the cover with a lift lug 125 in line with the hinge brackets 113 and forming the hinge end of the bail with an inwardly directed shoulder 129 adapted during unhooking of the bail, to slide under the lift lug, to engage the same upon raising the bail, and pry the cover loose.

Now considering the functional parts of the apparatus, the pump is typically of the impeller type driven by an electric motor 135, the pump and motor being mounted in position by a mounting bracket 137 which serves to close the wall opening behind the impeller.

The filter may be of any suitable type available, including a tank 141 from one end of which stub pipes 143 and 145 project for coupling to the integral pipe connections 65 and 67 associated with the valve chamber 13, thus permitting flow between the tank 141 and the valve chamber 13. A pressure gauge 147 installed on the tank affords information as to when the filter requires cleaning.

A slurry tank 148 may be mounted on the casting 11 to supply a slurry of diatomaceous earth to the suction end of the pump for replenishing of the filter when necessary. It will be controlled by a valve 149 adjacent the lower end of the slurry tank.

Returning to the multiple valve assembly 37, it may be of the general type forming the subject matter of Nash application for Filter Valve Assembly, Serial No. 187,812, filed April 16, 1962. As such, it involves a valve stem 151 coupled to the control handle stem 45 and carrying at its upper end a disk type valve 155 adapted to seat against the depending lip 35. This valve is backed up by a casting providing a cylindrical skirt 157 and depending guide fins 159, the skirt and fins being such as to slidably clear an inner peripheral rib 163 which defines the lower limit of the end section 29 of the valve assembly chamber 13.

In the periphery of the skirt is an O-ring 165 adapted to seat on said rib with the disk valve 155 in fully open position.

In like manner, at the lower extremity of the valve stem 151, is mounted a disk-type valve 169 for seating against lip 59, and such valve is backed up by a casting having a skirt 171 and guide fins 173 adapted to slidably clear an inner peripheral rib 175, which like the rib 163, provides a seat for an O-ring seal 179 encircling the skirt, when the valve 169 is in fully open condition.

With the multiple valve in the position depicted in FIG. 4, the system is set for normal pool operation and remains so until the pressure gauge on the filter indicates need for a cleaning of the filter.

When this becomes necessary, the multiple valve is shifted to the position indicated in FIG. 5. This cuts off the pool and reverses the pump connection to the filter, which causes a back wash of the filter, the discharge from which empties into the waste line.

The water for such back wash operation comes from the pool and enters the strainer chamber as previously, where it has access to the suction side of the pump.

In accordance with this invention an integrated structure for both filtering the water circulating to the pool and cleaning the filter is provided. This affords economy in manufacture, shipment and use, and convenience in installation.

While a preferred embodiment has been disclosed herein, many modifications thereof are feasible. This invention then is not to be restricted except insofar as is necessitated by the appended claims.

I claim:
1. Unitized apparatus for a swimming pool system comprising
  a casting having an outer wall and partition walls providing a strainer chamber,
  a valve assembly chamber, and
  a pump impeller chamber, one of said partition walls separating said pump impeller chamber from said strainer chamber, having a suction inlet opening from said strainer chamber to said pump impeller chamber, and
  a passageway connecting the periphery of said pump impeller chamber to said valve assembly chamber,
  said strainer chamber having an inlet opening, a straining means therein and a cover opening bounded by a sealing flange,
  a check valve normally closing said inlet opening
  a cover spanning said cover opening and having a sealing ring in sealing engagement with said sealing flange,
  means for clamping said cover to said flange, said means including
  a bail having at one end thereof a hinge connection to said casting and adapted to diametrically straddle said cover, and engage with said sealing flange, said hinge connection having a horizontal hinge pin and
  a manually adjustable pressure screw threadedly extending through said bail at substantially its midpoint and adapted to pressure engage said cover,
  and means for breaking the seal between said cover and seating flange, said means including
  a lift lug on said cover in line with said hinge connection, and a shoulder on the hinge end of said bail adapted to slide in under said lift lug and engage said lift lug to raise said cover upon lifting of said bail about said hinge pin.

2. Unitized apparatus for a swimming pool system comprising
  a casting having an outer wall and partition walls providing a strainer chamber,
  a valve assembly chamber, and
  a pump impeller chamber, one of said partition walls separating said pump impeller chamber from said strainer chamber, having a suction inlet opening from said strainer chamber to said pump impeller chamber, and
  a volute connecting the periphery of said pump impeller chamber to said valve assembly chamber,
  said strainer chamber having an inlet opening, a straining means therein and a cover opening bounded by a sealing flange,
  a hinged check valve normally closing said inlet opening,
  a cover spanning said cover opening and having a sealing ring in sealing engagement with said sealing flange, means for clamping said cover to said flange, said means including a bail having at one end thereof a hinge connection to said casting, and adapted to diametrically straddle said cover, said hinge connection including a hinge bracket extending from said casting, a slot through the hinge end of said bail, a hinge pin in said hinge bracket and loosely passing through the slot opening in said bail to permit a limited linear shift of said bail in addition to hinge movement thereof, a tongue extending from said seating flange at a point diametrically opposite said hinge bracket, an inturned hook at the proximate end of said bail adapted to hook under and engage said tongue, and a manually adjustable pressure screw threadedly extending through said bail at substantially its midpoint and adapted to pressure engage said cover, and means for breaking the seal between said cover and seating flange following release of said pressure screw and removal of said bail, said means including a lift lug on said cover in line with said hinge bracket, and a shoulder on the hinge end of said bail adapted to slide in under said lift lug and engage said lift lug to raise said cover upon lifting of said bail.

3. Unitized apparatus for a swimming pool system comprising a casting having an outer wall and partition walls providing a strainer chamber, a valve assembly chamber, a pump impeller chamber, one of said partition walls separating siad pump impeller chamber from said strainer chamber, said impeller chamber having a suction inlet opening from said strainer chamber to said pump impeller chamber, a volute connecting the periphery of said pump impeller chamber to said valve assembly chamber, said strainer chamber having a straining means therein, an inlet opening, and a cover opening bounded by a seating flange, a check valve normally closing said inlet opening, said valve assembly chamber having a pair of pipe connection openings for flow connection to a filter, a pipe connection opening for flow connection to a swimming pool, and a pipe connection opening for flow connection to waste, a cover spanning said cover opening and having a sealing ring in sealing engagement with said seating flange, means for clamping said cover to said flange, and means for prying said cover and seating flange apart following release of said clamping means.

4. Unitized apparatus disposed in a swimming pool system comprising a casting having an outer wall and partition walls providing a strainer chamber, a valve assembly chamber, a pump impeller chamber, one of said partition walls separating said pump impeller chamber from said strainer chamber, said impeller chamber having a suction inlet opening from said strainer chamber to said pump impeller chamber, a volute connecting the periphery of said pump impeller chamber to said valve assembly chamber, said strainer chamber having a straining means therein, an inlet opening, and a cover opening bounded by a seating flange, a check valve normally closing said inlet opening, said valve assembly chamber having a pair of pipe connection openings for flow connection to a filter, a pipe connection opening for flow connection to said swimming pool, and a pipe connection opening for flow connection to waste, and a multiple valve assembly in said valve assembly chamber having valve means simultaneously blocking flow to said flow connection to waste and flow between said pump and one of said filter pump connection openings while exposing the swimming pool pipe connection opening to the last named filter pipe connection opening and the remaining filter pipe connection opening to said pump, and means for shifting said valve means to a position blocking said swimming pool pipe connection opening and flow between said pump and said remaining filter pipe connection opening while exposing said first filter pipe connection opening to said pump and said remaining filter pipe connection opening to waste.

References Cited by the Examiner

UNITED STATES PATENTS

| 1,408,822 | 3/1922 | Mosher | 210—452 X |
| 1,634,463 | 7/1927 | Hills | 210—452 X |
| 2,032,886 | 3/1936 | Murphy et al. | 210—416 X |
| 2,324,356 | 7/1943 | Brown | 220—57 |
| 2,344,486 | 3/1944 | Arvins et al. | 210—452 X |
| 2,400,614 | 5/1946 | Vivian | 220—57 |
| 2,790,461 | 4/1957 | Lightfoot et al. | 210—169 X |
| 3,138,552 | 6/1964 | Richards | 210—169 |

FOREIGN PATENTS 561,923   5/1957   Italy.

OTHER REFERENCES

Perry: Chemical Engineers' Handbook, 3rd edition, 1950, McGraw-Hill, New York, p. 449 (Figure 84).

REUBEN FRIEDMAN, *Primary Examiner.*

HERBERT L. MARTIN, *Examiner.*

F. W. MEDLEY, R. A. CATALPA, *Assistant Examiner.*